United States Patent
Bass et al.

(10) Patent No.: US 6,739,803 B2
(45) Date of Patent: May 25, 2004

(54) METHOD OF INSTALLATION OF ELECTRICALLY HEATED PIPE-IN-PIPE SUBSEA PIPELINE

(75) Inventors: Ronald Marshall Bass, Houston, TX (US); Byron Lee Newberry, Edmond, OK (US); David John Liney, Chester (GB)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/910,678

(22) Filed: Jul. 20, 2001

(65) Prior Publication Data

US 2003/0017007 A1 Jan. 23, 2003

(51) Int. Cl.$^7$ .............................. F16L 1/00; F16L 53/00
(52) U.S. Cl. ...................... 405/169; 405/158; 405/170; 405/184.5; 138/115; 138/149
(58) Field of Search ................................ 405/158, 169, 405/170, 184.5; 138/113, 114, 115, 149, 148

(56) References Cited

U.S. PATENT DOCUMENTS

| | | | |
|---|---|---|---|
| 972,308 A | 10/1910 | Williamson | |
| 1,231,202 A | 6/1917 | Saylor | |
| 2,096,279 A | 10/1937 | Karcher | ....................... 255/28 |

(List continued on next page.)

FOREIGN PATENT DOCUMENTS

| | | | | |
|---|---|---|---|---|
| EP | 1070907 | | 1/2001 | ........... F16L/59/14 |
| FR | 1070907 A1 | * | 1/2001 | ........... F16L/59/02 |
| GB | 2084284 | | 4/1982 | ........... F16L/53/00 |
| SU | 569815 | | 9/1977 | |
| WO | 103122 | | 4/1937 | |
| WO | 1359445 | | 4/1972 | ........... F16L/25/00 |
| WO | 1437587 | | 7/1974 | ........... F16L/13/10 |
| WO | 1532730 | | 10/1976 | ........... F16L/25/01 |

OTHER PUBLICATIONS

Mollison, "Foam Insulation Gets First Reeled Installation off Australia", May 18, 1992, Oil and Gas Journal vol. 90, Issue 20, pp. 80–82.*

Anonymous, "Insulating Technique to see first use in North Sea Development", May 17, 1993, Oil and Gas Journal vol. 91, Issue 20, p. 61.*

Anonymous, Insulated Pipe—Precision Engineering, Jun. 2000, The Bayou Bulletin, Issue #8, from www.bayoupipe-.com/4News/Newslwtter08–4.htm, 2 pages.*

DeLuca, "Fields of Dreams", Apr. 1, 2001, Offshore Engineer, from www.oilonline.com/news/features/oe/20010401.Fields_o.520.asp, 9 pages.*

"Cable–Free Electrical Systems for the Oil to Gas Industry," Production Technologies Company, L.L.C., 600 Kenrick, Suite C–30; Houston, Texas 77060, advertisement, Copyright 1996, 6 pp.

"Dunbar in Depth," Offshore Engineer, Dec. 1994, 2 pp.

"Introduction to Direct Heating of Subsea Piplines,"overview byStatoil, Saga Petroleum, CSO Norge, Alcatel, Kabel Norge and EFI, Feb. 1988.

(List continued on next page.)

Primary Examiner—Robert J. Sandy
Assistant Examiner—Katherine Mitchell

(57) ABSTRACT

Methods are provided for installing an electrically heated pipe-in-pipe pipeline on the seafloor. Inner and outer pipe segments are formed and the inner pipe is coated and insulated. Coating may include sprayed polyurethane foam and insulating half-shells that are placed around welds. Epoxy is preferably coated on the inner pipe before other coatings. The segments are loaded on a lay barge and water stops are preferably installed in the annulus as the pipeline is formed. Water stops may be formed by placing a liquid polymer in the annulus and allowing it to cure.

9 Claims, 3 Drawing Sheets

U.S. PATENT DOCUMENTS

| | | | | |
|---|---|---|---|---|
| 2,178,720 | A | 11/1939 | Daniels | 219/47 |
| 2,206,831 | A | 7/1940 | Berthelsen | 74/440 |
| 2,217,857 | A | 10/1940 | Byck | 166/21 |
| 2,224,403 | A | 12/1940 | Lines | 219/39 |
| 2,306,831 | A | 12/1942 | Proctor | 219/39 |
| 2,660,249 | A | 11/1953 | Jakosky | 166/17 |
| 2,678,377 | A | 5/1954 | Justiz | 219/40 |
| 2,714,930 | A | 8/1955 | Carpenter | 166/60 |
| 2,757,738 | A | 8/1956 | Ritchey | 166/39 |
| 2,851,197 | A | 9/1958 | Colton | 222/146 |
| 2,982,354 | A | 5/1961 | Green | 166/60 |
| 3,184,958 | A | 5/1965 | Eaton | 73/40.5 |
| 3,388,724 | A * | 6/1968 | Mowell et al. | 138/149 |
| 3,423,570 | A | 1/1969 | Trabilcy | 219/301 |
| 3,432,186 | A | 3/1969 | Braun | 285/53 |
| 3,439,075 | A * | 4/1969 | Bauer et al. | 264/46.7 |
| 3,507,330 | A | 4/1970 | Gill | 166/248 |
| 3,515,837 | A | 6/1970 | Ando | 219/10.49 |
| 3,547,193 | A | 12/1970 | Gill | 166/248 |
| 3,556,218 | A | 1/1971 | Talley, Jr. et al. | 166/265 |
| 3,605,888 | A | 9/1971 | Crowson et al. | 166/248 |
| 3,614,986 | A | 10/1971 | Gill | 166/303 |
| 3,620,300 | A | 11/1971 | Crowson | 166/248 |
| 3,630,038 | A | 12/1971 | Ando | 61/72.1 |
| 3,642,066 | A | 2/1972 | Gill | 166/248 |
| 3,706,872 | A | 12/1972 | Trabilcy | 219/300 |
| 3,789,188 | A | 1/1974 | Rudbarg | 219/301 |
| 3,859,503 | A | 1/1975 | Palone | 219/278 |
| 3,885,595 | A * | 5/1975 | Gibson et al. | 138/155 |
| 3,933,031 | A | 1/1976 | Uhlarik | 73/40.5 R |
| 3,935,632 | A * | 2/1976 | Maxson | 138/149 |
| 3,944,262 | A | 3/1976 | Stiner et al. | 285/53 |
| 3,958,636 | A | 5/1976 | Perkins | 166/248 |
| 3,975,617 | A | 8/1976 | Othmer | 219/300 |
| 3,981,181 | A | 9/1976 | Ochiai | 73/40.5 R |
| 3,983,360 | A | 9/1976 | Offerman | 219/301 |
| 4,010,799 | A | 3/1977 | Kern et al. | 166/248 |
| 4,011,652 | A | 3/1977 | Black | 29/455 R |
| 4,017,102 | A | 4/1977 | Henderson | 285/41 |
| 4,140,179 | A | 2/1979 | Kasevich et al. | 166/248 |
| 4,142,093 | A | 2/1979 | Offerman | 219/301 |
| 4,319,632 | A | 3/1982 | Marr, Jr. | 166/60 |
| 4,401,162 | A | 8/1983 | Osborne | 166/248 |
| 4,450,711 | A | 5/1984 | Claude | 73/40.5 R |
| 4,496,174 | A | 1/1985 | Mcdonald et al. | 285/53 |
| 4,522,578 | A * | 6/1985 | Martin et al. | 425/110 |
| 4,553,023 | A | 11/1985 | Jameson et al. | 219/301 |
| 4,590,971 | A * | 5/1986 | Webster et al. | 138/149 |
| 4,644,780 | A | 2/1987 | Jeter | 73/40.5 |
| 4,645,906 | A | 2/1987 | Yagnik et al. | 219/301 |
| 4,667,505 | A | 5/1987 | Sharp | 73/40.5 R |
| 4,684,786 | A | 8/1987 | Mann et al. | 219/297 |
| 4,716,960 | A | 1/1988 | Eastlund et al. | 166/60 |
| 4,768,455 | A * | 9/1988 | Maxson et al. | 114/264 |
| 4,831,324 | A | 5/1989 | Asakura et al. | 324/57 R |
| 4,839,644 | A | 6/1989 | Safinya et al. | 340/854 |
| 4,861,074 | A | 8/1989 | Eastlund et al. | 285/53 |
| 4,874,925 | A | 10/1989 | Dickenson | 249/301 |
| 4,970,467 | A | 11/1990 | Burnett | 324/637 |
| 4,992,001 | A | 2/1991 | Harrison | 405/166 |
| 4,996,879 | A | 3/1991 | Kruka et al. | 73/592 |
| 5,072,622 | A | 12/1991 | Roach et al. | 73/40.5 R |
| 5,172,730 | A | 12/1992 | Driver | 138/104 |
| 5,189,374 | A | 2/1993 | Burnett | 324/534 |
| 5,270,661 | A | 12/1993 | Burnett | 324/527 |
| 5,289,561 | A | 2/1994 | Filho | 392/478 |
| 5,421,675 | A | 6/1995 | Brown et al. | 405/170 |
| 5,464,307 | A | 11/1995 | Wilkins | 405/166 |
| 5,490,562 | A | 2/1996 | Arnold | 166/267 |
| 5,605,798 | A | 2/1997 | Koster | 435/6 |
| 5,801,953 | A | 9/1998 | Thoma et al. | 364/487 |
| 5,836,719 | A | 11/1998 | Martin et al. | 405/166 |
| 5,905,194 | A | 5/1999 | Strong | 73/40.5 |
| 6,000,438 | A * | 12/1999 | Ohrn | 138/149 |
| 6,049,657 | A | 4/2000 | Sumner | 392/469 |
| 6,058,979 | A * | 5/2000 | Watkins | 138/149 |
| 6,114,857 | A | 9/2000 | Kohl | 324/534 |
| 6,142,707 | A | 11/2000 | Bass et al. | 405/158 |
| 6,179,523 | B1 | 1/2001 | Langner et al. | 405/169 |
| 6,264,401 | B1 * | 7/2001 | Langner et al. | 405/169 |
| 6,278,095 | B1 | 8/2001 | Bass et al. | 219/629 |
| 6,292,627 | B1 * | 9/2001 | Gilchrist, Jr. et al. | 392/311 |
| 6,305,429 | B1 * | 10/2001 | Welch et al. | 138/149 |
| 6,315,497 | B1 | 11/2001 | Wittman et al. | 405/158 |
| 6,364,401 | B1 | 4/2002 | Kim | 296/194 |
| 6,371,693 | B1 | 4/2002 | Kopp et al. | 405/158 |
| 6,382,259 | B1 * | 5/2002 | Codling | 138/149 |
| 6,509,557 | B1 | 1/2003 | Bass | 219/772 |
| 2003/0015436 | A1 | 1/2003 | Bass et al. | 205/740 |
| 2003/0015519 | A1 | 1/2003 | Stone, Jr. | 219/494 |
| 2003/0016028 | A1 | 1/2003 | Bass | 324/642 |
| 2003/0017007 | A1 | 1/2003 | Bass et al. | 405/154.1 |
| 2003/0020499 | A1 | 1/2003 | Bass | 324/721 |

OTHER PUBLICATIONS

"Monolithic Pipeline Electrical Isolation Joints," Hydro-Tech Systems, Inc., Engineered Pipeline Products, advertisement, Nov. 1996, 6 pp.

"New Double Pipe Insulated System (DPIS) Designed by Snamprogetti", Snamprogetti Offshore Division, Viale de Gasperi 16, San Donato Milanese, Milan, Italy, advertisement, 6 pp.

"Skin Effect Pipe Heating Systems," Thermo Systems Technology, Inc. (TST), Four Commerce Park Square, 23200 Chagrin Boulevard, Suite 600, Beachwood, Ohio 44122, Copyright 1991, advertisement, 4 pp.

Stop Paraffin Build–up and Realize Your Well's Full Potential . . . Plug in Paratrol. International, Inc. (PTI), 15423 Vantage Parkway East, Houston, Texas 77032, advertisement, Copyright 1989, 6 pp.

"Tubing Casing Wireless Telemetry (Tucas System),"Schlumberger web page (1993?/ Jun. 1996), 16 pp.

A. Anselmi et al., "TTDPIS: A New Underwater Technology in the Field of Traced Insulated Pipelines," 1994 OMAE, vol. 5, Pipeline Technology, ASME, 1994, pp. 69–76.

B. J. Eastlund et al., "New System Stops Paraffin Buildup," Petroleum Engineer, Jan. 1989, 3 pp.

Brochure –Combi Pipe –the end of clogged pipelines, Alcatel Contracting Norway and Aker Engineering, 7 pp.

Brochure –World Wide Experience List –Compressed Gas Insulated Transmission Bus System Type CGIT, ABB Power T & D Company Inc., 30 Oak Street,Westborough, MA 01581, USA, 6 pp.

C. G. Langer, "Engineering Report—1979 Construction of the Cognac 12–inch Pipeline From Mississippi Canyon Block 194 to Southwest Pass Bay East Central Facilities, Offshore Louisiana,"ES No. 74–82, Job No. 560513, Shell Oil Company, Pipeline Construction Department, *, 6 pp.

Compressed Gas Insulation Transmission Bus Ducts, ABB Power T&D Company, CGIT/PB Division, Westborough, MA, US 22 pages.

F. Aarseth and E. Bentsen, "Heating of Pipelines, and Power Supply to Subsea Electrical Equipment," Aker Engineering a.s. A. Bjømstad and B. Knutsen, Alcatel Contracting Norway a.s., DOT 1995, 23 pp.

F. R. Newbold and T. K. Perkins, "Wellbore Transmission of Electrical Power,", The Journal of Canadian Petroleum Technology, Jul.–Sep. 1978, Montreal, pp. 3–52.

F. G. Bosch, K. J. Schmitt, and B. J. Eastlund, "Evaluation of Downhole Electric Impedance Heating systems for Paraffin Control," Paper No. PCIC–90–34 presented at Industry Applications Society 37th Annual Petroleum and Chemical Industry Conference, Houston, Texas, Sep. 10–12, pp. 223–227.

Fred S. Epstein and Gary L. White, "Understanding Impedance Heating,"Chemical Engineering, May 1996, pp. 112–118.

Gaylord, N.G., Gaylord Associates, Newark, New Jersey, "Polymers –Part I. Polyalklene Oxides and Other Polyethers"; Interscience Publishers: New York–London–Syndey, pp. 9–80.

"General Product Specification—Pipeline Insulating Joint," HydroTech Systems, Engineered Pipeline Products, advertisement, pp.

H. Collins, and M.A.R. Lyle, Progress Reported in Design of Reelable Insulated Subsea Flow Lines, Oil and Gas Journal, Sep. 24, 1990, p. 102–106.

K. H. Akfhampour, "A Novel Approach to Solving Downhole Fluid Flow Problems by Use of an Electric Heating System", Paper No. PCIC–85–35, 12 pp.

Krevelen, D. W., Univ. of Technology. Delft. The Netherlands, "Properties of Polymers", 3.sup.rd Edition (Revised), Elsevier; Amsterdam–Oxford–New York–Tokyo, 1990; pp. 641–653.

Monobloc Insulating Joints Type "IK".

N. B. Carson, "A New Method for Heat Tracing Long Pipelines," ASME, 74–Pet–35, paper presented at the Petroleum Mechanical Engineering Conference, Dallas, Texas, Sep. 15–18, 1974, pp. 2–4.

Protest Document, Dec. 8, 1987 letter of Andrew W. Marr, Jr. to the Assistant Commissioner of Patents requesting issuance of U.S. patent 4,716,960 available in the file history as of Jan. 5, 1988.

R. Wash, "Electromagnetic Energy Helps Recovery," Gulf Coast Oil World,, Jun. 1986, pp. 18–19.

"Taking Induction Heating Underwater,"Process Heating, Jul./Aug. 1995, 1 p.

The Electrothermic Co. (TEC), 4916 Bear Lane, P.O. Box 4227, Corpus Christi, TX 78408 advertisement/sales brochure, 4 pp.

Anecdote—"Thermo Systems Under River Crossings" discussed in Supplemental Information Disclosure Statement filed on Jun. 22, 2000 for US patent application SN 08/921,737, filed Aug. 27, 1997, entitled, "Method for Maintaining Well Fluids Within a Shut–In Subsea Pipeline."

Anecdote—"Fuel Oil Between Buildings" discussed in Supplemental Information Disclosure Statement filed on Jun. 22, 2000 for US patent application SN 08/921,737, filed Aug. 27, 1997, entitled, "Method for Maintaining Well Fluids Within a Shut–In Subsea Pipline."

Anecdote—"Asphalt Transfer Liner from Tank Cars et al." discussed in Supplemental Information Disclosure Statement filed on Jun. 22, 2000 for US patent application SN 08/921,737, filed Aug. 27, 1997, entitled, "Method for Maintaining Well Fluids Within a Shut–In Subsea Pipeline."

Production Technologies Company Invention Discosure of R. M. Bass dated Jul. 24, 1986, "Disclosure for Controlled Paraffin Deposition in Subsea Pipelines" as discussed in Supplemental Information Disclosure Statement filed on Jun. 22, 2000 for US patent application S/N No. 08/921,737, filed Aug. 27, 1997, entitled "Method for Maintinaing Well Fluids Within a Shut–In Subsea Pipeline."

Purported Invention Disclosure of Production Technologies Company, L.L.C. (PTC) by Bernard J Eastlund and John Haeber, dated Apr. 28, 1995. Apparatus for Introducing Electric Current into and Offshore Pipline. 4pp as discussed in Supplemental Information Disclosure Statement filed on Jun. 22, 2000 for US patent application S/N No. 08/921,737, filed Aug. 27, 1997, entitled "Method for Maintinaing Well Fluids Within a Shut–In Subsea Pipeline."

"Direct Impedance Heating of Deepwater Flowlines," OTC 11037, May, 1999.

* cited by examiner

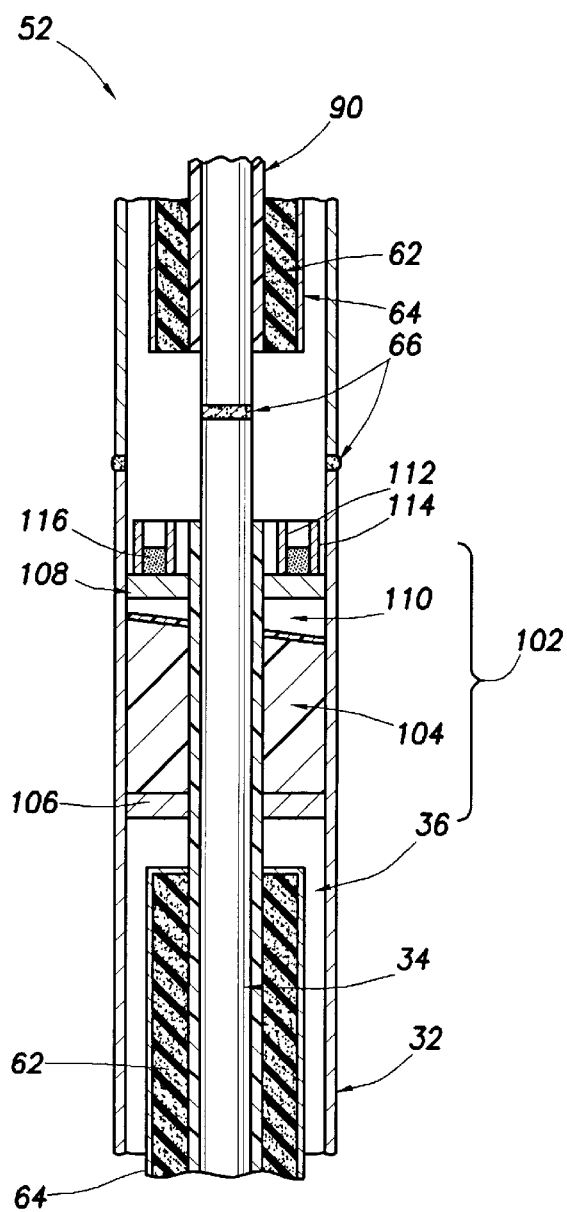
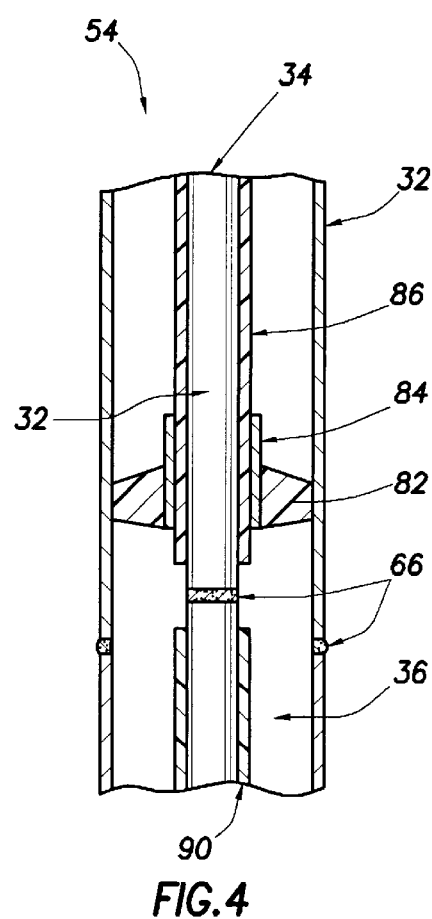
FIG.3
FIG.4

METHOD OF INSTALLATION OF ELECTRICALLY HEATED PIPE-IN-PIPE SUBSEA PIPELINE

BACKGROUND OF THE INVENTION

1. Field of the Invention

The present invention relates to installation of electrically heated subsea pipelines. More particularly the invention relates to methods for installation of electrically heated subsea pipelines having a pipe-in-pipe configuration.

2. Description of Related Art

Offshore hydrocarbon recovery operations are increasingly moving into deeper water and more remote locations. Often satellite wells are completed at the sea floor and are tied to remote platforms or other facilities through extended subsea pipelines. Some of these pipelines extend through water that is thousands of feet deep, where temperatures of the water near the sea floor are in the range of 40° F. The hydrocarbon fluids, usually produced along with some water, reach the sea floor at much higher temperatures, characteristic of depths thousands of feet below the sea floor. When the hydrocarbon fluids and any water present begin to cool, phenomena occur that may significantly affect flow of the fluids through the pipelines. Some crude oils become very viscous or deposit paraffin when the temperature of the oil drops, making the oil practically not flowable. Hydrocarbon gas under pressure combines with water at reduced temperatures to form a solid material, called a "hydrate." Hydrates can plug pipelines and the plugs are very difficult to remove. In deep water, conventional methods of depressurizing the flow line to remove a hydrate plug may not be effective. Higher pressures in the line and uneven sea floor topography require excessive time and may create operational problems and be costly in terms of lost production.

The problem of lower temperatures in pipelines has been addressed by a variety of heating methods, including electrical heating. Most of the proposals for electrical heating of pipelines have related to pipelines on land, but in recent years industry has investigated a variety of methods for electrical heating of subsea pipelines. ("Direct Impedance Heating of Deepwater Flowlines," OTC 11037, May, 1999). One electrical heating method is the pipe-in-pipe method. In one configuration of a pipeline using this method, a pipe-in-pipe subsea pipeline is provided by which a flow line for transporting well fluids is surrounded concentrically by and electrically insulated from an electrically conductive outer pipe until the two pipes are electrically connected at the distal or remote end of a heated segment by a bulkhead. Voltage is applied between the inner and outer pipes at the proximate or electrical input end and electrical current flows along the exterior surface of the inner pipe and along the interior surface of the outer pipe. This pipe-in-pipe method of heating is disclosed, for example, in U.S. Pat. No. 6,142,707. Other variations of the general pipe-in-pipe method exist. The electrical power is supplied through an electrical isolating joint at the power input end of a segment of line to be heated. Alternating current, normally at about 60 Hz, is used. The voltage across the annulus is highest at the isolating joint and falls linearly to zero at the bulkhead. The current is essentially constant along the entire length of the pipe segment that is heated. Two key electrical effects, the skin effect and the proximity effect, confine the current flow largely to the annulus surfaces. Consequently, most of the current is effectively isolated from the produced fluids and the seawater around the pipeline.

In pipe-in-pipe electric heating configurations, annulus apparatus that electrically isolates the inner and outer pipe and provides thermal insulation and load sharing is desirable. Electrical isolation between the inner and outer pipe is needed so that the pipes will not short out. Thermal insulation is advantageous because it minimizes heat loss from the inner pipe and reduces the amount of electrical current necessary to achieve the desired temperature in the inner pipe. Load sharing between the pipes helps limit the stress on the outer pipe during laying.

A method for installation of apparatus in the annulus that prevents complete flooding of the annulus and confines flooding caused by a breach of the outer pipe to a subsection of the annulus is needed. There is also a need for methods for installation of apparatus that allows for electrical heating in the presence of small amounts of water in the annulus.

SUMMARY OF THE INVENTION

Towards providing these and other advantages, the present invention provides a method for installing a segment of an electrically heated pipe-in-pipe subsea pipeline by spraying on an insulating ring along the outer surface of inner pipe joints, inserting the inner pipe joints in outer pipe to form a pipe-in-pipe segment, placing the pipe-in-pipe segment at a selected angle on a pipe-laying barge, inserting water seals at selected locations in the annulus and joining the segment to another segment of the pipeline that has previously been placed subsea. A method for forming a pipe-in-pipe quad is provided. Double joints are formed and joined to form quad of both the inside and outside pipe. Double joints of the inside pipe are insulated by a spraying process and joined by welding and the weld-affected area is then insulated and protected from risk of water in the annulus causing an electrical short. A method for forming a water stop in an annulus using a liquid polymer that solidifies in the annulus is also provided.

DESCRIPTION OF THE DRAWINGS

For a more complete understanding of the invention and the advantages thereof, reference is now made to the following description taken in conjunction with the following drawings in which like reference numbers indicate features and wherein:

FIG. 3 is a cross sectional sketch of a pipe-in-pipe configuration for direct heating of a pipeline showing the components in the annulus in deeper water segments of the pipeline.

FIG. 4 is a cross sectional sketch of a pipe-in-pipe configuration for direct heating of a pipeline showing the components that reside in the annulus in shallower water segments of the pipeline.

DETAILED DESCRIPTION

U.S. Pat. No. 6,142,707 and U.S. patent applications entitled "Annulus for Electrically Heated Pipe-in-Pipe Subsea Pipeline" and "Apparatus and Method for Electrical Testing of Electrically Heated Pipe-in-Pipe Pipeline," both filed concurrently herewith and commonly owned, are hereby incorporated herein by reference.

Figure 1:
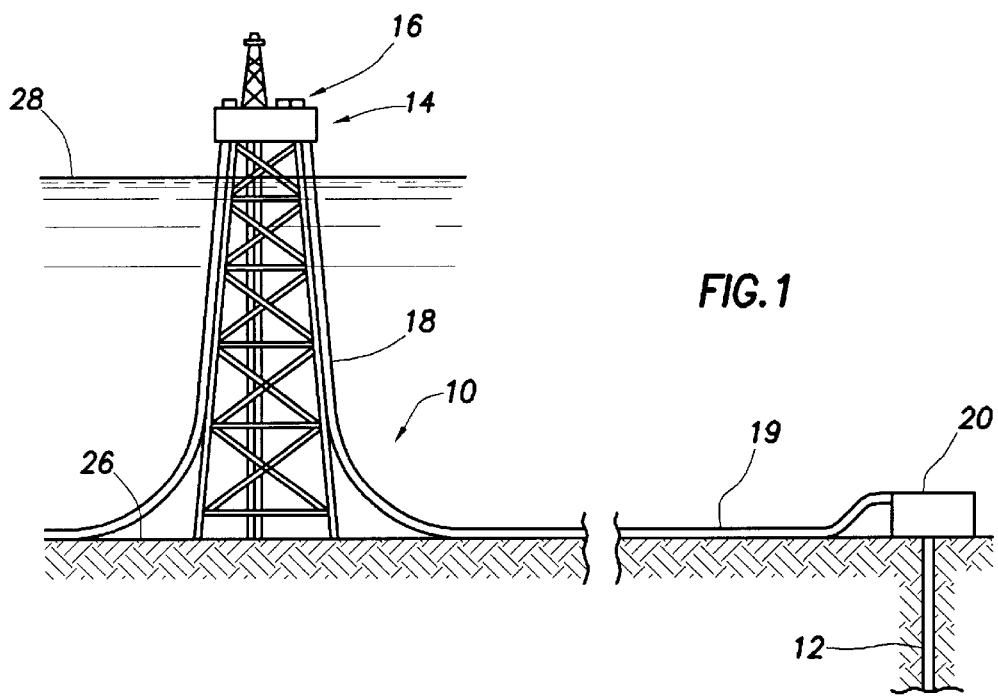
FIG. 1 is a view of a platform and a satellite subsea well connected by subsea pipeline.

FIG. 1 illustrates the environment of the present invention. Here remote satellite well 12 is connected to platform 14 with subsea pipe-in-pipe pipeline 10. Subsea pipeline 10 may consist of seafloor section 19 and riser section 18. Surface facilities 16 on platform 14 include an electrical power supply. Seafloor section 19 may be up to 20 or more miles long. Pipe-in-pipe flowline 10 may be composed of 40-ft joints of pipe welded together. It is common to form individual 160 ft segments of pipe, called quads (four joints), which are then welded together as they are placed subsea to form pipe-in-pipe flowline 10. Seafloor section 19, which may be a half-mile or more below surface 28 of the ocean, terminates at sled 20.

Figure 2:
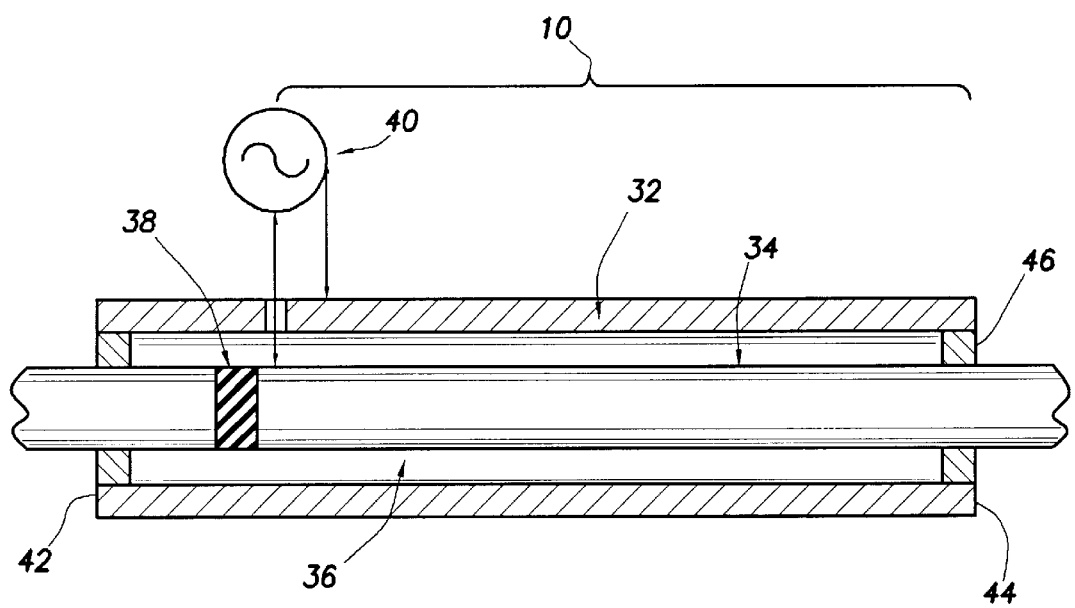
FIG. 2 is a cross sectional sketch of a pipe-in-pipe configuration for direct heating of a pipeline.

FIG. 2 illustrates one embodiment of an electrically heated pipe-in-pipe pipeline. In the embodiment shown in FIG. 2, pipeline 10 includes electrically conductive outer pipe 32 and electrically conductive product flowline or inner pipe 34 arranged concentrically. Annulus 36 is defined between inner pipe 34 and outer pipe 32. Insulating joint 38, which is normally in proximity to platform 14, structurally joins and electrically insulates inner pipe 34 from outer pipe 32. Electrical power supply 40 is connected across inner pipe 34 and outer pipe 32. Thus pipe-in-pipe flowline 10 serves as a power transmission line, with the circuit completed by an electrical pathway connecting inner pipe 34 and outer pipe 32 at a second end 44 of the pipeline, which is normally in proximity to sled 20. By transmitting power, the entire heated segment of pipeline 10 serves as an electrical heater. The connection for joining the inner and outer pipes is provided by electrically conductive bulkhead 46. In another embodiment, insulating joint 38 is placed between two bulkheads and electrical power is input at an intermediate point, which may be near the midpoint of pipeline 10, with electrical pathways completing the circuit on both ends of pipeline 10.

To prevent electrical shorts across annulus 36, inner pipe 34 must be electrically isolated from outer pipe 32 along the entire length of heated segment 10 except at bulkhead 46. Carrier pipe 34 may be thermally insulated to minimize heat loss and to reduce the amount of electrical power necessary to heat the contents of the pipe. Since electrical current flow is the same over the length of pipeline 10 and water temperature decreases with increasing water depth, the preferred amount of thermal insulation in different portions of riser 18 may vary. This may lead to the need for different annulus designs in different portions of pipeline 10. A design having less thermal insulation may be desirable for at least a portion of riser 18.

FIG. 3 shows, generally, apparatus 52 for use in an annulus where greater thermal insulative properties are needed. The outer surface of inner pipe 34 may be provided with electrically insulating coating 90, which may be fusion bonded epoxy. Such coating, when applied with an appropriate thickness, such as 20 thousandths of an inch or more, can withstand up to 8000 volts before failing, even after being wetted for several days. Electrically insulating coating 90 may have gaps around weld locations 66, where it is destroyed during welding.

Inner pipe 34 is further thermally and electrically insulated by insulating ring 62, which surrounds inner pipe 34 and layer 90 and extends a selected distance along the length of inner pipe 34. Insulating ring 62 is preferably made of a thermally and electrically insulative material such as polyurethane foam. Insulating ring 62 also serves to centralize inner pipe 34 within outer pipe 32, and may be formed by extrusion of an insulating material around inner pipe 34. Insulating ring 62 may also have solid skin 64 on its outer surface that serves to protect insulating ring 62 from mechanical damage during installation. Solid skin 64 may be used to provide a water barrier that protects insulating layer ring 62 if insulating ring 62 is porous and to provide an additional layer of electrical insulation. Examples of the material of solid skin 64 are polyurethane and polyethylene. A small clearance between solid skin 64 and outer pipe 32 reduces heat loss from inner pipe 32 by decreasing convection in annulus 36. The clearance between solid skin 64 and the inner surface of outer pipe 32 is preferably less than about 0.25 inch.

Water stops may be needed in pipe-in-pipe flowline segment 10 to prevent complete water flooding of annulus 36 in the event of a breach in outer pipe 32 or failure of other equipment in the system. Even partial flooding of annulus 36 may cause an electrical short and prevent its further use. The effort required to remove water from the annulus and restore the pipeline to service can be reduced by separating the annulus into water-tight compartments. Electrically insulating water-proof barriers capable of withstanding the water pressure outside the pipeline across the barrier are needed. As shown in FIG. 3, water stop 102 may be used as a part of apparatus 52. Water stops may be used in every quad or less frequently. For instance, water stops such as stop 102 may be used every third quad (480 feet apart) in pipeline 10, both in seafloor section 19 and in riser 18 to reduce the risk of catastrophic flooding.

Water stops such as stop 102 fill annulus 36 for a selected longitudinal distance. Water stop 102 consists primarily of plug 104 which is contiguous with the outer surface of inner pipe 34 and the inner surface of outer pipe 32. Impermeable seals 106 and 108 may be placed in contact with the face of each end of plug 104. All the components of water stop 102 should be made of electrically insulating materials or otherwise electrically insulated.

In order to reduce the mechanical stress on either inner pipe 34 or outer pipe 32 during pipe laying (placing the pipe on the seafloor), mechanical stress is preferably transferred between pipes. This load-sharing may be provided by plug 104. Because plug 104 is selected to seal the annulus and adhere to the surfaces of both the outer wall of inner pipe 34 and the inner wall of outer pipe 32, it provides the necessary load-sharing.

Exposed metal surfaces of pipes in contact with plug 104 are preferably cleaned or sanded so as to form an adherent surface. The material of plug may be polyurethane. The plug may be formed from a liquid that is placed in the annulus as the pipeline is being laid. Flowmax 6000, sold by Flowtech Corp. of Houston, Tex. is one such polyurethane that functions in this application. Plug 104 then provides mechanical support for adjacent impermeable seals 106 and 108. If outer pipe 32 were breached on either side of water stop 102, sea water would push against one of the impermeable seals 106 and 108. Impermeable seal 106 or 108 would in turn push against plug 104, which is mechanically held in place by its attachment to the piping walls or by ridges that may be provided on the pipe wall. The seals are energized by pushing against the plug under pressure. Plugs may be of any reasonable length, for example, between 1.5 and 3 feet. The preferred length of plug 104 depends on the outside water pressure at the operating depth of the pipeline. The higher the external pressure, the more support that impermeable seals 106 and 108 will require in case of a breach of outer pipe 32 or other failure. Plug 104 may also perform as a thermal insulator.

Because plug 104 should adhere to the outer surface of inner pipe 34, insulating layer ring 62 and solid skin 64 are removed from inner pipe 34 along the length of plug 104. Removal of layer 62 should be minimized to maximize thermal and electrical integrity. For example, in the embodiment shown in FIG. 3, which is designed to operate at pressures near 1500 psi, 5 feet of insulating layer ring 62 are removed to accommodate a 2-ft plug. During installation, care should be taken to avoid contamination by lubricants or other substances of pipe surfaces that will be in contact with plug 104. These substances may prevent plug 104 from properly adhering to pipe surfaces.

Where plug 104 is made of polyurethane, the adhesion of plug 104 to pipe surfaces may be improved by the presence of an adherent coating, such as a fusion bonded epoxy, on pipe surfaces that will be in contact with plug 104. Improved bonding may result during plug 104 installation with fusion bonded epoxy on pipe surfaces because the epoxy may chemically react with polyurethane during cure of the polyurethane.

Seals 106 and 108, placed against the ends of plug 104, may be sized such that they form a tight fit in annulus 36. To yield a tight fit, seals 106 and 108 may be slightly larger, for instance, 1.5 to 2% larger, than the maximum width of annulus 36. Seals 106 and 108 may be made of rubber. Rubbers with a durometer of 40 to 65 are preferred as a material of construction. In addition, a rubber which is not susceptible to charring is preferred so that electrical arcs will not char the seal and self-propagate. Silicone-based rubbers are suitable. In one embodiment, second seal 108 is formed using a poured-in-place elastomer. An acceptable material is SYLGARD, a product of Dow Corning. In a preferred embodiment, rubber seals with no parting lines (from a mold) on seal surfaces are used. Silicone grease or similar materials may also be applied to the surface of inner pipe 34 where impermeable seals 106 and 108 are installed, to prevent the seals from rolling during installation.

Depending on the method of pipe laying employed, the upper surface of plug 104 may not be perpendicular to the axes of the pipes. This results when plug 104 is poured into the annulus as a liquid and cures with the axis of the pipes not in a vertical direction. This is a common orientation in pipe-laying operations. If the upper surface of plug 104 is not perpendicular to the axis of pipes 32 and 34, seal 108 may fail. This problem may be ameliorated by placing solid angle-correcting piece 110 over plug 104. Solid angle-correcting piece 110 should be constructed of an electrically insulating material that resists arcing along its surface. DELRIN or NYLON (which may be between two pieces of DELRIN) are two such suitable materials. The lower, angled surface of correcting piece 110 should fit over the angled upper surface of plug 104 such that the upper surface of correcting piece 110 forms a surface perpendicular to the axis of pipes 32 and 34. This method may require that correcting piece 110 be custom manufactured with the appropriate angle on its lower surface. This angle will depend on the angle at which the pipes are held on a pipe-lay barge when the plug material is poured into the annulus. Correction piece 110 is placed in the annulus oriented such that the face of the piece contacts the face of plug 104.

Although a large amount of water in annulus 36 may lead to a catastrophic failure because it may form an electrical short between inner pipe 34 and outer pipe 32, it is possible and prudent to design annulus 36 so that small amounts of water will not lead to a system short. Small amounts of water may be present in annulus 36 due to condensation of water vapor in annulus 36 or due to rain and sea water that may enter annulus 36 during the installation of pipe-in-pipe pipeline 10. The main concern with water arises in quads that do not lie horizontal. As shown in FIG. 3, in non-horizontal quads, any water present in annulus 36 will run down and collect on impermeable seal 108, where it can cause a short circuit across annulus 36. This problem is not normally present in horizontally oriented quads because water will spread along the bottom of annulus 36 for the entire length of pipe-in-pipe flowline 10 between two water stops and will not bridge from outer pipe 32 to inner pipe 34. In order to prevent the collected water from forming a short circuit in the non-horizontal portion of the pipeline, one or more electrically insulating collars shown in FIG. 3 as electrically insulating collars 112 and 114 may be formed on seal 108 to reduce pooling of water across annulus 36. Electrically insulating collars 112 and 114 allow a certain amount water to collect on either side or the collars without shorting the annulus. The preferred height of collars 112 and 114 is determined by the amount of water that may be in the annulus. Collars 112 and 114 are preferably made tall enough to allow several hundred grams of water to collect without causing a short circuit. A suggested height range is about 1.5 to 3 inches, although other heights may also be suitable. A two-collar arrangement such as shown in FIG. 3 can accommodate super absorbent pack 116 between the collars. Super absorbent pack 116 may be placed on top of seal 108 and held within rubber collars 112 and 114, which maybe integral with seal 106. Super absorbent pack 116 traps water in the annulus and increases the amount of water that can be safely present in quads that are not horizontal. The use of super absorbent pack 116 can reduce the need for water-removal techniques, such as placing annulus 36 under vacuum between seals. Super absorbent pack 116 removes water (up to its capacity) from anywhere in the section of annulus 36 extending from impermeable seal 106 to the next impermeable seal above it. Super absorbent pack 116 may be formed from polyacrylates or other known super absorbents.

In each water stop of this embodiment, the impermeable seal that would reside at the higher elevation if the quad were to be positioned at an angle from the horizontal may be equipped with the same water management devices as impermeable seals 106 or 108, shown in FIG. 3. Each of these seals, like impermeable seals 106 and 108 may have two collars 112, 114 and a super absorbent pack 116. In addition, seals with the same water management devices as seals 106 and 108 may be installed in quads that do not contain a water stop. For these unsupported impermeable seals, the application of silicone grease to the outer surface of inner pipe 34 where the water seal sits is especially important to prevent the seals from rolling when the pipes move relative to each other.

A shallower-depth design shown in FIG. 4 may be employed in a selected part of riser 18 where water temperatures are higher and heat loss from the pipeline is less. This may include the upper-most quads of the riser section 18 (FIG. 1). FIG. 4 illustrates one embodiment of such apparatus in annulus 36. Insulating layer ring 62 (FIG. 3) is omitted to avoid overheating during electrical power input. In the embodiment shown in FIG. 4, centralizers 82 are used to provide electrical insulation and to centralize inner pipe 34 and outer pipe 32. Centralizers are most often cone-shaped wedges made of nonconductive materials. In one embodiment, centralizers may be composed of multiple parts such as described in U.S. Pat. No. 6,142,707. Centralizers 82 may be present at selected intervals in annulus 36 along the entire length. The spacing may vary depending upon local conditions, but typically is about 10–20 feet, except at locations containing water stops. The materials of construction for centralizers 82 are selected such that they are able to withstand the voltages present across the annulus and such that they do not char if arcing occurs. DELRIN and NYLON are preferred materials for voltages up to about 4000 volts. The outside surface of centralizers 82 may be beveled such that wet scale, possibly present in annulus 36, is unlikely to form an electrically conductive bridge between inner pipe 34 and outer pipe 32. Collar 84 may also be provided on the top side of the centralizers 82 to further block arcing resulting from any debris lying across the centralizers 82. Carrier pipe 32 may also be surrounded by electrically insulating layer ring 86. Insulating layer ring 86 provides electrical insulation in case contamination does establish a bridge spanning from inner pipe 34 to outer pipe 32. Insulating layer ring 86 may be a layer of solid polyurethane, approximately 0.25 inch thick. Coating 90 of fusion bonded epoxy may be present on inner pipe 34.

During heating, the applied electric power required and the calculated heating rate may be based on the assumption that the heated segment is on the sea floor and that a hydrate is residing in inner pipe 34. However, the upper quads of riser section 18 will heat up faster because of higher water temperature. Furthermore, inner pipe 34 will also not likely contain a hydrate in shallower-depth section 54 because near sea level the ambient temperature and internal pressure are usually not in the range of pressure-temperature when hydrates form. Thus, the quads in shallower-depth section 54 may overheat while in heating mode. If annulus 36 in shallower-depth section 54 exceeds a critical temperature, electrically insulating materials may break down resulting in an electrical short in the upper quads of riser section 18, where the voltages across annulus 36 are highest. By omitting insulating layer ring 62 in shallower-depth segment 54, the inner pipe temperature rise may be limited to about 20° F., because of higher heat loss. Although thermal insulation is not required in shallower-depth section 54, electrical insulation and load sharing between inner pipe 34 and outer pipe 32 may be needed.

Figure 5:
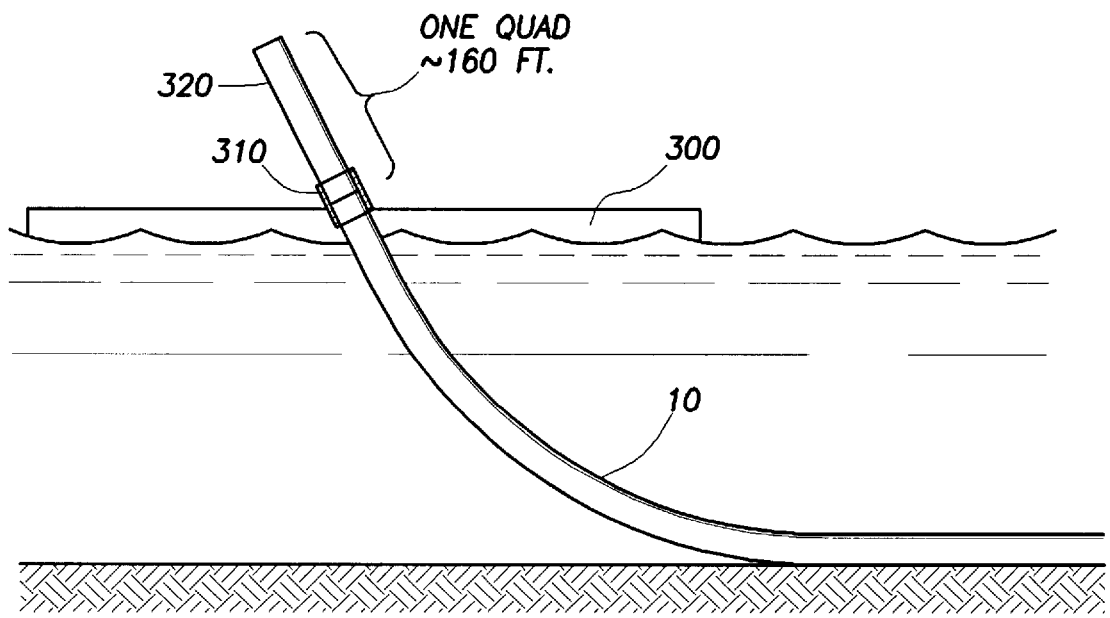
FIG. 5 is a schematic of the pipe-laying barge.

A view of one method of laying the pipeline is shown in FIG. 5. Individual 160-ft segments of pipe-in-pipe 320, called quads (four joints), are welded together at weld station 310 on lay barge 300 to form pipe-in-pipe flowline 10. Normally, quads 320 are oriented at an angle with respect to vertical when the quad in on lay barge 300.

To form the quads, which are preferably formed before the pipe is placed on a lay barge, two 40-foot joints of inner pipe 34 (FIG. 3) are welded together to form a double joint of inner pipe 34. At this time, the double joint of inner pipe is coated with electrically insulating coating 90 (FIG. 3), which is preferably fusion bonded epoxy, using techniques well known in industry. Following this coating process, insulating ring 62 is installed, most typically by spraying of a thermally and electrically insulating material such as polyurethane foam, around the pipe. The epoxy coating serves to increase bonding of the polyurethane to the pipe. Weld joints and nearby pipe may be coated with fusion bonded epoxy before spraying of insulating ring 62.

Figure 6:
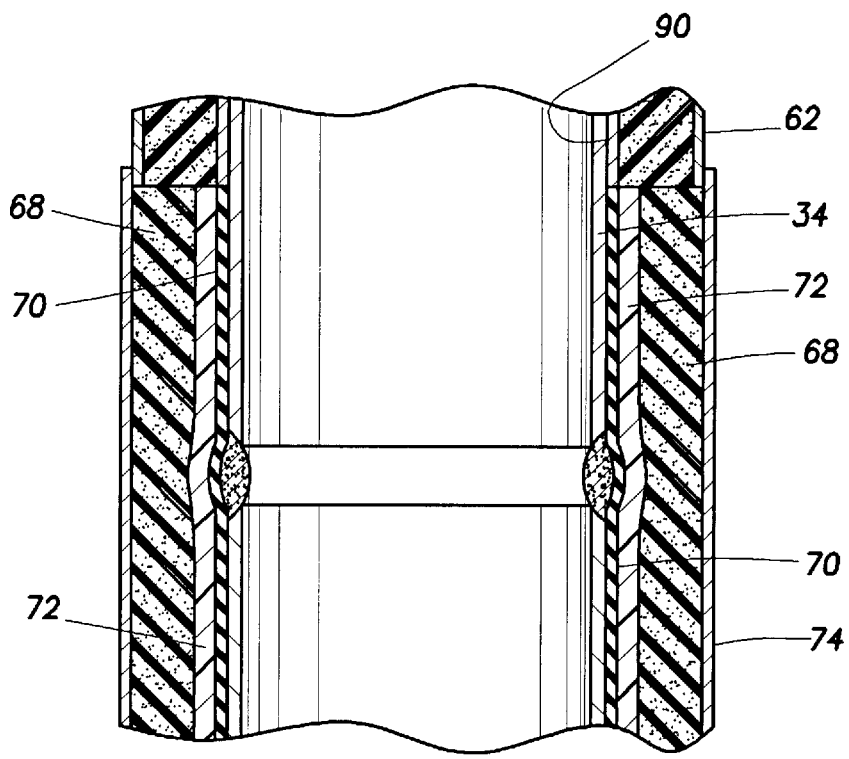
FIG. 6 is a cross-sectional sketch of the pipe-in-pipe flowline with the half-shells over a weld joint.

Following installation of insulating ring 62, two double joints of inner pipe 34 may be welded together to form a quad of inner pipe 34. Before welding, a section of insulating ring 62 is removed from the area that will be immediately around the weld. As shown in FIG. 6, the portions of insulating ring 62 removed before welding are replaced with half shells 68. Half shells 68 are made of a thermally and electrically insulating material such as the polyurethane foam used to form ring 62. Inner pipe 34 near the weld is preferably first coated with weld coating 70. Weld coating 70 is preferably a polymeric material, such as solid polyurethane. Machine blending and spray application of the material forming weld coating 70 both aid in assuring its consistency. Weld coating 70 may then be covered by shrink sleeve 72 prior to installation of half shells 68. Shrink sleeve 72 is designed to provide a further water barrier. Shrink sleeve 72 is most commonly formed of polyethylene, although any polymeric material with similar characteristics may be used. A sheet of the polymeric material is wrapped around the pipe and heated to set in place.

After installation of half shells 68, half shells 68 may be further coated with a material similar to that of weld coating 70 to provide additional protection against water intrusion to inner pipe 34. Half shells 68 should then be secured to assure they are not inadvertently removed during installation. One method of securing half shells 68 is with tape 74, such as nylon tape, although clamps or other methods securing half-shells 68 could also be used. It is important that the method of securing half shells 68 not provide an arc path and the material used to secure half shells 68 should not be conductive. The ends of the quad of inner pipe 34, and frequently the ends of insulating ring 62, are coated with a similar material to that of weld coating 70. This coating is applied to create a long "creep" path for any arcs that may later form between inner pipe 34 and outer pipe 32 across the insulation surface, such as if water is present.

Sections of outer pipe 32 should be formed into quads in a manner similar to that of inner pipe 34. It is important that the inside of outer pipe 32 be relatively free of scale prior to welding. The inside of the sections of outer pipe 32 may be painted, but areas where plug 104 and seals 106 and 108 (FIG. 3) are to be placed should be kept free of paint to allow greater adhesion of plug 104 and seals 106 and 108. Sections of outer pipe 32 may be welded together to form a quad of outer pipe 32. The quad of outer pipe 32 may also contain sections needed for laying pipe-in-pipe flowline 10, such as a Jay-lay collar and/or a pup joint. After welding, it is preferred to test the welds used to form the quad of outer pipe 32 to assure proper clearance and for presence of debris. Any debris remaining in the weld areas should be removed, such as through the use of a foam pig. A calibrated steel plate may be attached to the pig and used to check weld clearances.

The quad of inner pipe 34 may then be inserted into the quad of outer pipe 32. Blown air may be used during insertion to remove debris or water present in the annulus during the insertion process. Some damage to insulating ring 62 may be expected to occur during insertion, particularly if either the quad of inner pipe 34 or the quad of outer pipe 32 are not straight. It is important that the damage not completely penetrate insulating ring 62.

Following insertion, the quad of inner pipe 34 and the quad of outer pipe 32 form quad 320 (FIG. 5) which may then be tested using techniques described in the patent application titled "Apparatus and Method for Electrical Testing of Electrically Heated Pipe-in-Pipe Pipeline," filed concurrently herewith, before transport to lay barge 300. Quad 320 is placed at a selected angle for the pipe-laying process, using techniques well known in industry. The ends of quad 320 should then be readied for welding. Quads are welded together on the lay barge using the same techniques as described above for welding two joints to form a quad. It is preferable to fit the top end of quad 320 with a protective cover to prevent water from entering quad 320, such as through rain or possibly wave or spray action. Electrical integrity testing after installation of a quad is carried out using testing procedures and apparatus described in the patent application "Apparatus and Method for Electrical Testing of Electrically Heated Pipe-in-Pipe Pipeline."

At selected locations in the annulus of pipeline 10, a water stop is installed. This may be in each quad, in every three quads, or at other intervals. Installation of a water stop begins with installation of seal 106 (FIG. 3). The seal is placed at a selected distance from the top of the last quad welded. Then a measured amount of polyurethane is poured into the annulus on top of seal 106. A suitable polyurethane is Flowmax 6000, sold by Flowtech Corporation of Houston, Tex. The surface of the polyurethane in plug 104 will be horizontal, and will not be perpendicular to the axis of pipes 32 and 34 if, as shown in FIG. 5, the axis is not vertical. Therefore, after the polyurethane has cured, angle correction piece 110 may be installed. The purpose of this piece is to provide support for seal 108, which is installed on top of angle correction piece 110. The use of seal 108, plug 104 and angle correction piece 110 may not be required in every quad 320. It is preferable to install seal 106 in each quad 320, as it acts to control water during construction and normal operations when outer pipe 32 has not been breached. Following the installation of plug 104 and seals 106 and 108, super-absorbent pack 116 may be placed on top of seal 106. On top of seal 106 are collars 112 and 114, which may be integral with seal 106. These collars are electrically insulative and provide a trap for a limited amount of water that may collect on top of seal 106. Preferably the one or more collars are integral with the seal. Pack 116 may be a permeable covering over a super-absorbent material, such as commercially available acrylates used for water absorptive properties.

It is important to protect the annulus in quad 320 from contamination with water. Other than placing a tarp over the annulus to protect it from both water and weld bead, mineral wool may be placed in the annulus. The welds may be inspected using ultrasonic inspection. In this case, care should be taken to avoid introduction of water from the ultrasonic inspection into the annulus. Backing rings or other devices may be used to prevent weld spatter from entering the annulus during the welding of the outer pipe.

While particular embodiments of the present invention have been described, it is not intended that these details should be regarded as limitations on the present invention, except to the extent that they are included in the appended claims. It should be understood that various changes, substitutions and alterations can be made hereto without departing from the spirit and the scope of the invention as defined by the appended claims.

What is claimed is:

1. A method for installing a segment of an electrically heated pipe-in-pipe subsea pipeline, comprising:

(a) providing a plurality of inner pipe joints and outer pipe joints, the inner pipe joints having an outer surface;

(b) spraying an insulating ring over the outer surface of the inner pipe joints;

(c) inserting the inner pipe joints and the insulating ring into the outer pipe joints to form a first pipe-in-pipe segment, the first pipe-in-pipe segment having an annulus;

(d) placing the first pipe-in-pipe segment on a pipe-laying barge;

(e) inserting watertight first water seal into the annulus of the second pipe-in-pipe segment and (f) joining the first pipe-in-pipe segment to a second pipe-in-pipe segment, the second pipe-in-pipe segment having an annulus and an axis.

2. The method of claim 1 further comprising the step of placing a liquid polymer in the annulus of the second pipe-in-pipe segment over the first water seal and allowing the polymer to cure to form a plug; and inserting a second water seal into the annulus, the second water seal so placed as to abut the plug, the second water seal having an upper surface, before step (f).

3. The method of claim 2 further comprising the step of placing a super-absorbent pack on the upper surface of the second water seal before step (f).

4. The method of claim 1 further comprising the steps of placing a liquid polymer in the annulus of the second pipe-in-pipe segment over a first water seal and allowing the polymer to cure to form a plug;

inserting an angle-correcting piece in the annulus of the second pipe-in-pipe segment, the angle-correcting piece being oriented to place a first face of the piece in contact with the plug and a second face of the piece perpendicular to the axis of the second segment;

inserting a second water seal into the annulus, the second water seal so placed as to abut the plug, the second water seal having an upper surface, before step (f).

5. The method of claim 1 further comprising during step (c) the step of blowing air into the annulus.

6. The method of claim 1 further comprising prior to step (c) the step of removing debris from the inside surface of the outer pipe segments.

7. The method of claim 1 further comprising prior to step (b) the step of coating the outer surface of the inner pipe with a plastic coating.

8. The method of claim 7 wherein the plastic coating is fusion bonded epoxy.

9. The method of claim 1 further comprising the step of placing insulating half-shells over the inside pipe at selected locations before step (f).

* * * * *